(12) United States Patent
Kaundinya

(10) Patent No.: US 7,515,901 B1
(45) Date of Patent: Apr. 7, 2009

(54) METHODS AND APPARATUS FOR AUTHENTICATING DEVICES IN A NETWORK ENVIRONMENT

(75) Inventor: Murali P. Kaundinya, Bridgewater, NJ (US)

(73) Assignee: Sun Microsystems, Inc., Santa Clara, CA (US)

( * ) Notice: Subject to any disclaimer, the term of this patent is extended or adjusted under 35 U.S.C. 154(b) by 640 days.

(21) Appl. No.: 10/786,529

(22) Filed: Feb. 25, 2004

(51) Int. Cl.
*H04M 3/16* (2006.01)
(52) U.S. Cl. .................. 455/411; 455/415; 380/247; 380/270
(58) Field of Classification Search ............ 455/411, 455/415, 410, 418; 380/247, 270; 340/5.8; 349/5.8
See application file for complete search history.

(56) References Cited

U.S. PATENT DOCUMENTS

| | | | | |
|---|---|---|---|---|
| 6,128,389 A | * | 10/2000 | Chan et al. ............ | 380/247 |
| 6,611,913 B1 | * | 8/2003 | Carroll et al. ........... | 713/171 |
| 6,721,555 B1 | * | 4/2004 | Phillips et al. .......... | 455/411 |
| 6,760,444 B1 | * | 7/2004 | Leung ................... | 380/270 |
| 6,782,080 B2 | * | 8/2004 | Leivo et al. ............. | 379/93.04 |
| 6,819,219 B1 | * | 11/2004 | Bolle et al. ............. | 340/5.52 |
| 6,842,106 B2 | * | 1/2005 | Hughes et al. ........... | 340/5.8 |
| 7,039,611 B2 | * | 5/2006 | Devine .................. | 705/44 |
| 2002/0161723 A1 | * | 10/2002 | Asokan et al. ........... | 705/67 |
| 2004/0054905 A1 | * | 3/2004 | Reader .................. | 713/171 |
| 2004/0208151 A1 | * | 10/2004 | Haverinen et al. ........ | 370/338 |
| 2005/0138355 A1 | * | 6/2005 | Chen et al. .............. | 713/155 |
| 2005/0166091 A1 | * | 7/2005 | Boylan et al. ............ | 714/19 |

\* cited by examiner

*Primary Examiner*—Nghi H Ly
(74) *Attorney, Agent, or Firm*—Brooks Kushman P.C.

(57) ABSTRACT

Mechanisms and techniques provide for authenticating devices in a network such as a Radio Frequency Identification (RFID) Network between control stations and one or more transceivers. A transceiver receives transceiver configuration information including a network address and transceiver authentication credentials and receives an authentication request from the control station. The transceiver applies authentication processing to request information within the authentication request in conjunction with the transceiver authentication credentials to produce an authentication response and transmits the authentication response to the control station to allow the control station to determine if the transceiver is authorized to communicate within the remote identification system.

51 Claims, 4 Drawing Sheets

METHODS AND APPARATUS FOR AUTHENTICATING DEVICES IN A NETWORK ENVIRONMENT

BACKGROUND

Conventional wireless computer and communication networking environments include computerized devices equipped with wireless communications circuitry that enables wireless (e.g., radio frequency) communications to take place between the devices operating in the network. One example of such a conventional wireless network is a radio frequency identification (RFID) network or system that enables communication with objects that contain or have radio frequency identification tags affixed thereto.

In a typical configuration of a conventional RFID network, a central control computer system communicates with a group of transceiver devices known as "tag readers" that are distributed or installed for operation over a particular geographical coverage area or zone. Each tag reader is able to broadcast a radio frequency signal according to a specific tag communications protocol that causes the individual radio frequency tags affixed to objects in the zone of that tag reader to respond with information such as a unique tag identity programmed into each tag. In this way, the tag reader can detect the unique tag identities of all tagged objects within that tag reader's "readable" zone and can report this information back to the central computer system. This allows the central computer system to identify and track the existence of specific tagged objects within the zone of each transceiver within the RFID system.

As a specific example, in a retail setting, an aisle in a store may contain items of merchandise for sale that each contains an attached RFID tag that is encoded with a unique identification code. The central computer system may periodically activate a tag reader positioned in a location nearby the aisle to cause the tag reader to send out a radio frequency signal having a special modulated encoding that causes the tagged items of merchandise in the store to report their identity or other information to the tag reader via activation of circuitry within each tag in response to the signal from the tag reader. The tag reader collects the reported identities of the tagged merchandise and returns this information to the central control computer system for inventory control and sales tracking purposes. RFID network equipment manufacturers and developers are presently deploying RFID networks in a variety of operational environments such as manufacturing, shipping and retail settings to provide a mechanism for tracking large numbers of tagged objects.

Early implementations of RFID networks provided for hard-wired or physical communications links such as data communications cables extending from the central computer system to each transceiver (i.e., each tag reader was physically coupled with a communications link to the central computer system). However, more recent developments in RFID technology resulting difficulties in dealing with geographic complexities of operating environments of RFID networks have resulted in the ability of tag readers to communicate wirelessly with the central control computer system. This allows the tag readers to be placed in convenient locations throughout the geographic region of coverage desired for the RFID network and avoids constraints imposed by any requirement to provide physical data communications cable paths to the tag readers. In addition, in situations in which an RFID network needs to be expanded to additional geographic regions or zones, wireless communications between the tag readers and the central control computer system enables quick network expansion capability by simply adding additional tag readers at locations requiring RFID coverage without wiring a data communications link from the central computer system to those zones.

SUMMARY

Conventional wireless communications networks suffer from a variety of deficiencies related to security and authentication between wireless transceiver devices such as RFID tag readers and a central computer system operating in such networks. As an example, conventional RFID networks do not provide robust and dynamically changing security mechanisms that support authentication between transceivers (i.e., tag readers) and the central control computer system used in such networks prior to allowing the tag readers to operate in such networks. Due to the lack of a robust and adaptable authentication mechanism between transceivers and the central control computer system, conventional wireless and RFID networks are susceptible to malicious or fraudulent attacks in which an individual substitutes an existing wireless transceiver such as a RFID tag reader with a compromised transceiver that has been intentionally modified to report fraudulent or altered tagged object information within the RFID network.

As an example, consider the RFID network used in the retail setting briefly discussed above. If the tag readers operate using wireless communications mechanisms and are distributed throughout a store in order to track merchandise information, an individual with malicious intent could enter the store with a new maliciously configured transceiver tag reader and could substitute an existing wireless transceiver with this new transceiver could be modified to spoof the central control computer system by reporting incorrect tagged object activity (e.g., movement) or tag identity information. Such unauthorized RFID transceivers could, for example, establish themselves as part of the local RFID geographical network and send spurious data to the central controlling computer system or to other devices in such a network. As another example, an unauthorized RFID transceiver might be able to "sniff" or listen to network traffic and thereafter masquerade as another device within the network in order to interfere with or provide fraudulent tagged object information within the network.

Conventional wireless networks offer some conventional security mechanisms such certificates or key-based encryption protocols that operate between a base station (e.g. a central controller) and wireless devices (e.g., 802.11 wireless transceivers). However, such conventional security protocols such as the Wireless Encryption Protocol (WEP) and/or certificates do not dynamically change in real-time. In other words, once a conventional wireless device is configured with a key for use in WEP or a certificate or a digital signature, this information does not change within the device in a dynamic manner during use of the authentication mechanism. Accordingly, conventional key or certificate-based data encryption and authentication algorithms do not provide the ability to modify data (e.g., key or certificate data) used during the protocol to provide or impose dynamic modified operation in real-time. Moreover, in specific network environments such as RFID networks, there are no conventional mechanisms in place that operate between a base station or central control computer system to provide mechanisms to check the authenticity of a wireless transceiver tag reader operating in an RFID network and to disallow participation of unauthorized transceivers in the network environment since such systems do not provide proper authentication and/or authorization mechanisms for such transceivers prior to allowing them to operate within the RFID network.

Embodiments of the invention significantly overcome such drawbacks and deficiencies of conventional wireless communication authentication systems by providing dynamically changeable mechanisms and techniques to distinguish between authorized and unauthorized transceivers (e.g., tag readers) in a communications network such as an RFID network. In particular, embodiments of the invention provide a mechanism to allow a computer system such as the central control computer system or base station in an RFID network to perform a challenge/response protocol as defined herein to properly authenticate and authorize operation of transceiver tag readers within the network. Communications provided from transceivers within the network that cannot be authenticated according to the challenge/response protocol are ignored. In this manner, embodiments of the invention provide a robust and dynamically changeable mechanism for communications devices used in networks such as RFID networks to avoid problems such as the placement of a compromised or unauthorized transceiver within the network for disruption of proper network operation.

More specifically, embodiments of the invention provide mechanisms and techniques for authenticating operation of the transceiver with a control station within a wireless remote identification system such as an RFID network. Embodiments of the invention operate within a central control station and within one or more transceivers such as tag readers placed within the network. Within a transceiver equipped with an embodiment of the invention, the transceiver operates to receive transceiver configuration information including a network address and transceiver authentication credentials.

The network address may be, for example, a Machine Access Code (MAC) address as well as an Internet Protocol (IP) network address assigned to the transceiver by a Dynamic Host Control Protocol (DHCP) process or other address assignment process operating within the control station or within a separate DHCP or address assignment server. In one embodiment, assignment of the IP address to the transceiver is only allowed and performed if a Machine Access Control (MAC) address of the transceiver has been pre-configured into the DHCP server in the network. In such an embodiment, when the transceiver is activated (i.e., is turned on or appears to be attempting communications for request of an address) within the network and provides a request to the DHCP server for an assigned network address, the DHCP server checks to see if the MAC address contained in the address request from that transceiver has been registered with the DHCP or other address server. If a network administrator has properly registered the MAC address of the requesting transceiver with the DHCP server, the DHCP server responds with a valid IP address for use by that transceiver within the network. Otherwise, the DHCP server can send an alarm to transceiver management software in the central control computer system indicating that an unauthorized transceiver device is trying to intrude and operate within the RFID network.

In one embodiment, receipt of the transceiver authentication credentials includes receiving a transceiver identification code (e.g., an Electronic Product Code or EPC code) that is uniquely assigned to that specific transceiver, and further includes receiving a transceiver instruction set containing a set of authentication values and corresponding authentication instructions. The authentication values may be, for example, a set of strings of alphanumeric characters randomly generated within the control station. For each alphanumeric character string, the authentication credentials can include a corresponding authentication instruction that maybe, for example, a logic instruction such as AND, OR, XOR, NOR, NAND, a shift operation (e.g., right shift or left shift) or an instruction set modification operation such as an instruction to "roll" the instruction set forward or backward.

Depending upon the embodiment of the invention, these authentication credentials (string and logic instruction pairs) are configured manually (e.g., via a network operator during the first installation of the transceiver into the network) or automatically (e.g., via automatic download during a trusted time period) into the transceiver prior to installation within the network. In addition, in one embodiment of the invention the transceiver operates to periodically receive replacement transceiver authentication credentials to replace the transceiver authentication credentials currently configured into the device such that the operations of authenticating the transceiver using the credentials will be different each time it is performed with a different replacement set of transceiver authentication credentials. As will be explained, the authentication credentials allow the system of the invention to determine if the transceiver is a properly authorized transceiver to communicate within the network. Furthermore, since the credentials are dynamically modifiable and updateable, the authentication processing of the system of the invention can dynamically change and account for situations in which a malicious individual somehow obtains or gets possession of a set of currently acceptable credentials and programs a compromised transceiver with such information to allow this compromised transceiver to operate on the network. By periodic replacement of credentials in an automated manner, the compromised transceiver will no longer be able to use the old credentials for proper operation in the network.

Once configured, the transceiver configured according to embodiments of the invention receives an authentication request from a control station within the remote identification system. In one embodiment, the request information within the authentication request includes a request authentication result and a request data value. The request authentication result in one configuration is a hash value result produced from a hash function within the control station. The control station performs this hash function on a selected one of the alphanumeric character strings within an equivalent set of authentication credentials maintained by the control station on behalf of the transceiver being authenticated. In other words, the authentication request from the control station in one embodiment of the invention provides a hash value that the control station calculates on a randomly selected alphanumeric character string within the set of authentication credentials associated with this transceiver. The request data value in the authentication request is used during application of a selected logic instruction within the transceiver, as will be explained.

Upon receiving the authentication request from the control station, the transceiver applies authentication processing to request information within the authentication request in conjunction with the transceiver authentication credentials to produce an authentication response. In particular, in one embodiment of the invention this involves the transceiver being able to identify an authentication instruction that matches the request authentication result and applying the authentication instruction that matches the request authentication result to the request data value from the authentication request to produce the authentication response. In particular, in one embodiment, for the transceiver to properly identify an authentication instruction that matches the request authentication result, the transceiver applies an authentication function (e.g., a hash function, equivalent to the one applied by the control station) to authentication values (e.g., to the set of alphanumeric string values) in the set of authentication values within the transceiver authentication credentials to produce corresponding transceiver authentication results (e.g., a resulting set of hash values). For each transceiver authentication result produced, the transceiver determines if the transceiver authentication result (i.e., its own hash value) matches the request authentication result (i.e., the hash value produced by and received from the central control station) for that authentication value. That is, in one embodiment the authentication function is an equivalent hash function within the transceiver (i.e., is the same hash function as used by the control station) and the request authentication result is calculated by the control station using the hash function on a copy of the authentication values in the set of authentication values within the transceiver authentication credentials that is programmed into the control station. If the transceiver authentication result matches the request authentication result for that authentication value, the transceiver has found the matching authentication instruction or function and performs the operation applying that authentication instruction to produce the authentication response.

In this manner, when the authentication request containing a hash value from the control station is received by the transceiver, the transceiver can compute its own hash value on authentication values in its credentials and can compare this computed hash value to hash value received from the control station. If a match is detected, the authentication instruction corresponding to matching hashed authentication value is then applied to the request data value to produce the authentication response value. Only if the control station and the transceiver are configured with equivalent authentication credential information will an authentication response value be acceptable to the control station. In one embodiment of the invention the authentication instruction, such as one of the logic instructions listed above, is applied to the request data value received from the control station in conjunction with the transceiver identification code (e.g., the EPC code assigned to this transceiver) to obtain the authentication response.

After performing this processing, the transceiver transmits the authentication response to the control station to allow the control station to determine if the transceiver is authorized to communicate within the remote identification system. In this manner, embodiments of the invention operate to provide a challenge and response protocol between the central control station in the transceiver operate within a network such as and horrified the network to allow the control station to authenticate each transceiver and allow its operation within the network. This processing can be periodically repeated between the control station and one or more transceivers any number of times in order to initially confirm and accept the transceiver onto the network. In addition, the system of the invention can perform this processing periodically at random or scheduled intervals in order to continually authenticate the proper operation of the transceiver within the network. This allows embodiments of the invention to detect a situation, for example, when an authorized transceiver's identity is hijacked and the authorized transceiver is replaced within an unauthorized transceiver. Since the system of the invention allows periodic replacement of the credentials within the transceiver, a compromised transceiver can be detected after a short period of time depending upon the replacement interval and depending upon how frequently the authentication processing is performed.

Other embodiments of the invention include a computer system, such as a computerized or electronic device or set of such devices working in conjunction with each other, a workstation, a handheld or laptop computer, or other such device or devices configured with software and/or circuitry to process all of the method operations disclosed herein as embodiments of the invention. Such computerized device embodiments can include an RFID transceiver and an RFID control station programmed to operate according to the processing explained herein. In such embodiments, the computerized device includes an interface (e.g., a network interface for receiving data such as the sets of distribution data), a memory (e.g., any type of computer readable medium), a processor and an interconnection mechanism connecting the interface, the processor and the memory. In such embodiments, the memory system is encoded with a transceiver processing application that when performed (e.g., executed, run, interpreted or otherwise operated) on the processor, produces a network configuration process that causes the computerized device to perform any and/or all of the method embodiments, steps and operations explained herein as embodiments of the invention to allow authentication of transceivers in a network such as an RFID network. In other words, a computer or transceiver device that is programmed to operate as explained herein is considered an embodiment of the invention.

Other arrangements of embodiments of the invention that are disclosed herein include software programs to perform the method embodiment steps and operations summarized above and disclosed in detail herein. As an example, a transceiver manager software application configured to operate as explained herein is considered an embodiment of the invention. More particularly, a computer program product is disclosed which has a computer-readable medium including computer program logic encoded thereon that, when executed on at least one processor with a computing system, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a control station computer system or into a transceiver other computerized device to cause the device to perform the techniques explained herein as embodiments of the invention including transceiver authentication processing operations.

It is to be understood that the system of the invention can be embodied strictly as a software program, as software and hardware, or as hardware or circuitry alone and may be a combination of such elements in a single device or distributed within a system such as a communications network such as an RFID network or other wireless or physical network or an equivalent system to perform device authentication.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
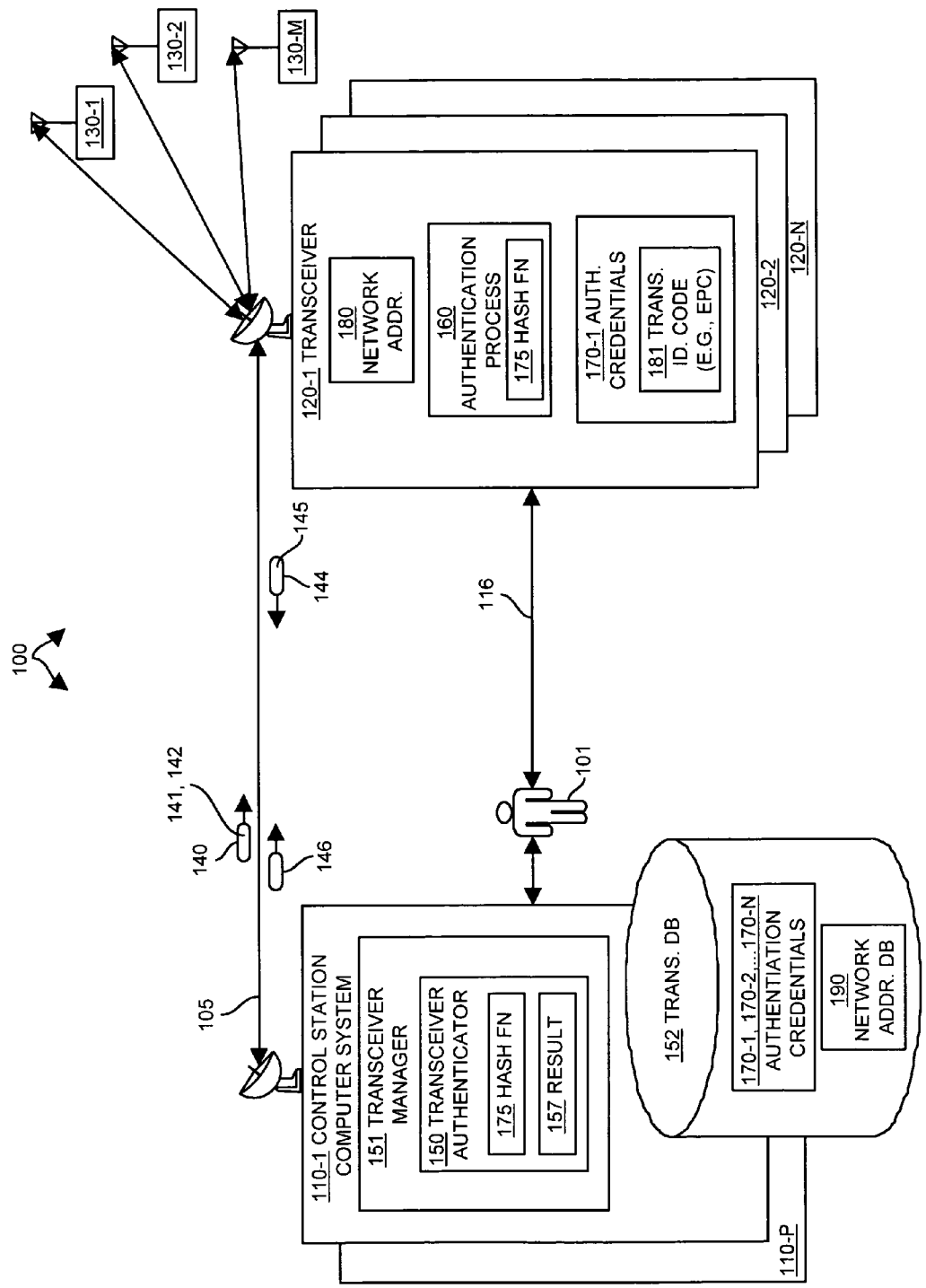
FIG. 1 shows an example network such as a Radio Frequency Identification Network including a control station and transceivers configured according to one embodiment of the invention.

FIG. 1 illustrates a networking environment 100 that operates as a remote identification system including one or more control stations 110-1 through 110-P configured to communicate over a transceiver network 105 with transceivers (e.g., RF ID tag readers) 120-1 through 120-N in accordance with an example embodiment of the invention. Each control station 110-1 through 110-P may be, for example, a personal computer system, workstation or other type of computer system or computerized device that operates a transceiver manager 151. The transceiver manager 151 is, in this example, an RFID network management control program (e.g., a software application) that operates to communicate with the transceivers 120 to perform RFID network processing within the transceiver network 105. The transceiver network 105 may be a wireless communications medium or, alternatively, may be a physical communications medium such as a data communications cable. A network manager 101 (e.g., a person responsible for managing the network 100) interacts with the control station 110 (and can also interact with the transceivers 120, such as for installation purposes, if required).

Generally, the transceiver manager 151 within the control station 110 is able to control the transceivers 120 in order to cause each transceiver 120 to communicate with a set of tagged items 130-1 through 130-M to communicate with and collect the identity of those tagged items 130 readable (i.e., within the geographic vicinity) by each transceiver 120. The transceiver manager 151 within the control station 110 includes a transceiver authenticator 150 configured to operate in accordance with embodiments of the invention to allow the control station to authenticate each transceiver 120. The transceiver authenticator 150 operates in conjunction a transceiver database 152 containing sets of authentication credentials 170-1 through 170-N (one for each transceiver 120 in this example) accessible to the control station 110 (e.g., configured into memory, persistent storage or available from the remote source) to perform the authentication processing explained herein. The transceiver database 152 in this example embodiment also contains a set of network address information 190 that contains, for example, the set of allowable Machine Access Control (MAC) addresses of each transceiver 120 that will be allowed to perform communications with the control station 110 concerning tagged item information, along with corresponding assigned IP addresses provided transceivers 120.

Each transceiver 120 operates an authentication process 160 (e.g., a software program encoded within firmware, a microcontroller, circuitry or other processing mechanism) that communicates with the transceiver authenticator 150 in the control station 110 in order to provide the authentication mechanisms and perform the processing techniques as explained herein. Each transceiver 120-1 through 120-N in this example is further configured with a respective set of authentication credentials 170-1 through 17-N and a respective network address 180-1 through 180-N. The set of authentication credentials 170 maintained with a transceiver 120 is also maintained as a corresponding set of authentication credentials 170 within the control station 110. If each transceiver 120 has a different set of credentials 170, then the central control station 110 maintains a copy of each different set of credentials 170.

It is to be understood that in alternative configurations of the invention, each transceiver 120-1 through 120-N may be configured with a common (e.g., universal or the same) set of authentication credentials 170 and the control station 110 can use this common set of authentication credentials 170 for each of the separate transceivers 120 such that the authentication credentials 170 for one transceiver are the same as the authentication credentials for another transceiver 120. The example illustrated FIG. 1 however uses a distinct set of authentication credentials 170 for each transceiver 120 to provide additional security.

To perform the authentication processing explained herein, the control station 110 and the transceivers 120 exchange a series of authentication messages (as will be explained) to allow the transceiver authenticator 150 operating within the control station 110 to determine if a particular transceiver 120 should be allowed to communicate within the transceiver network 105 (i.e., should be allowed report information concerning tagged items 130 to the control station 110 for processing by the transceiver manager application 151). The particular processing operations resulting in the creation of the authentication messages exchanged between control station 110 and the transceivers 120 will now be explained with respect to the flowchart of processing steps illustrated in FIGS. 2 through 4.

Figure 2:
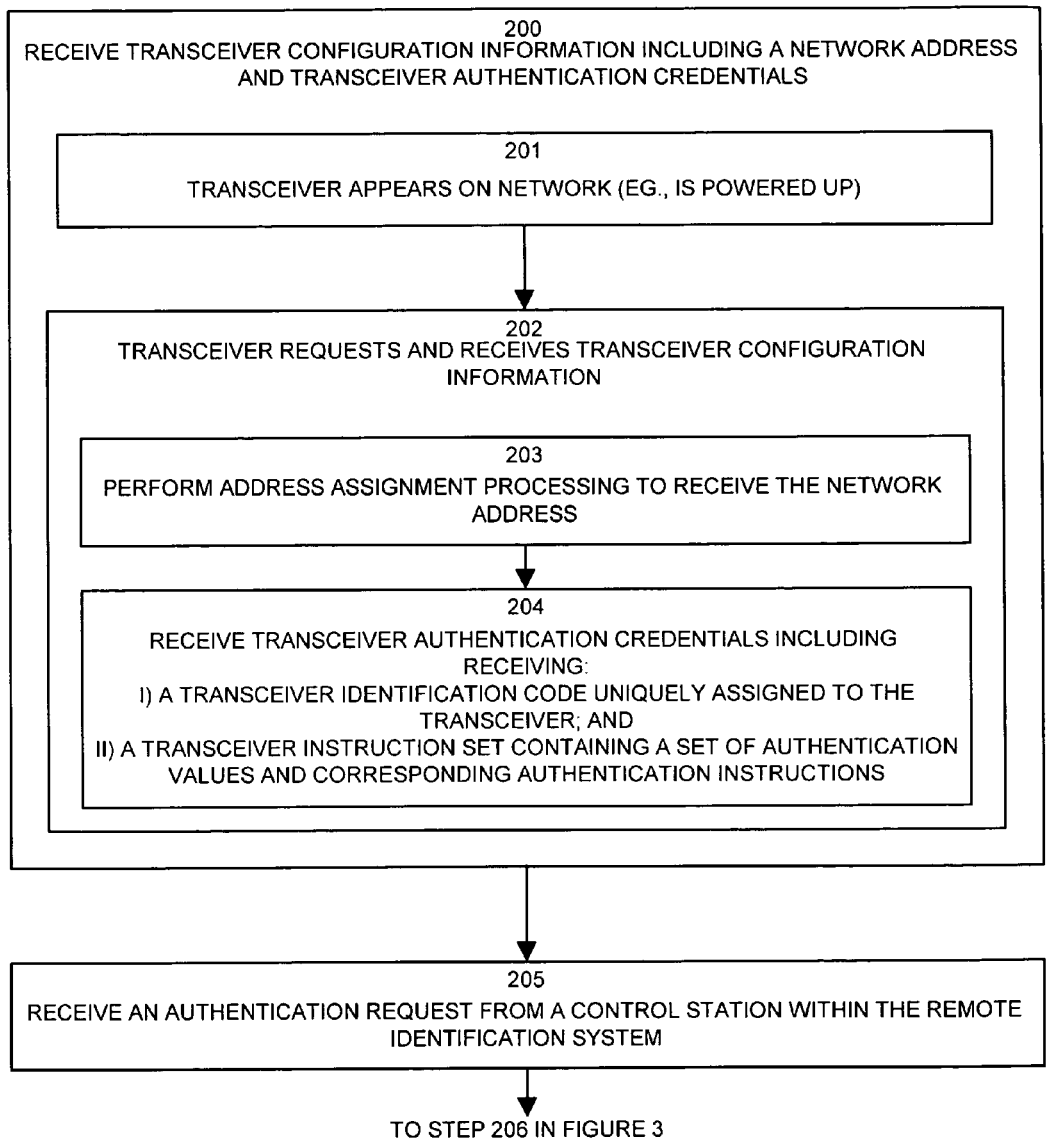
FIGS. 2 through 4 are a flow chart of processing steps performed by a control station computer system and transceiver to allow the control station to authenticate the transceiver for use in a the RFID network shown in FIG. 1 in accordance with embodiments of the invention.
Figure 3:
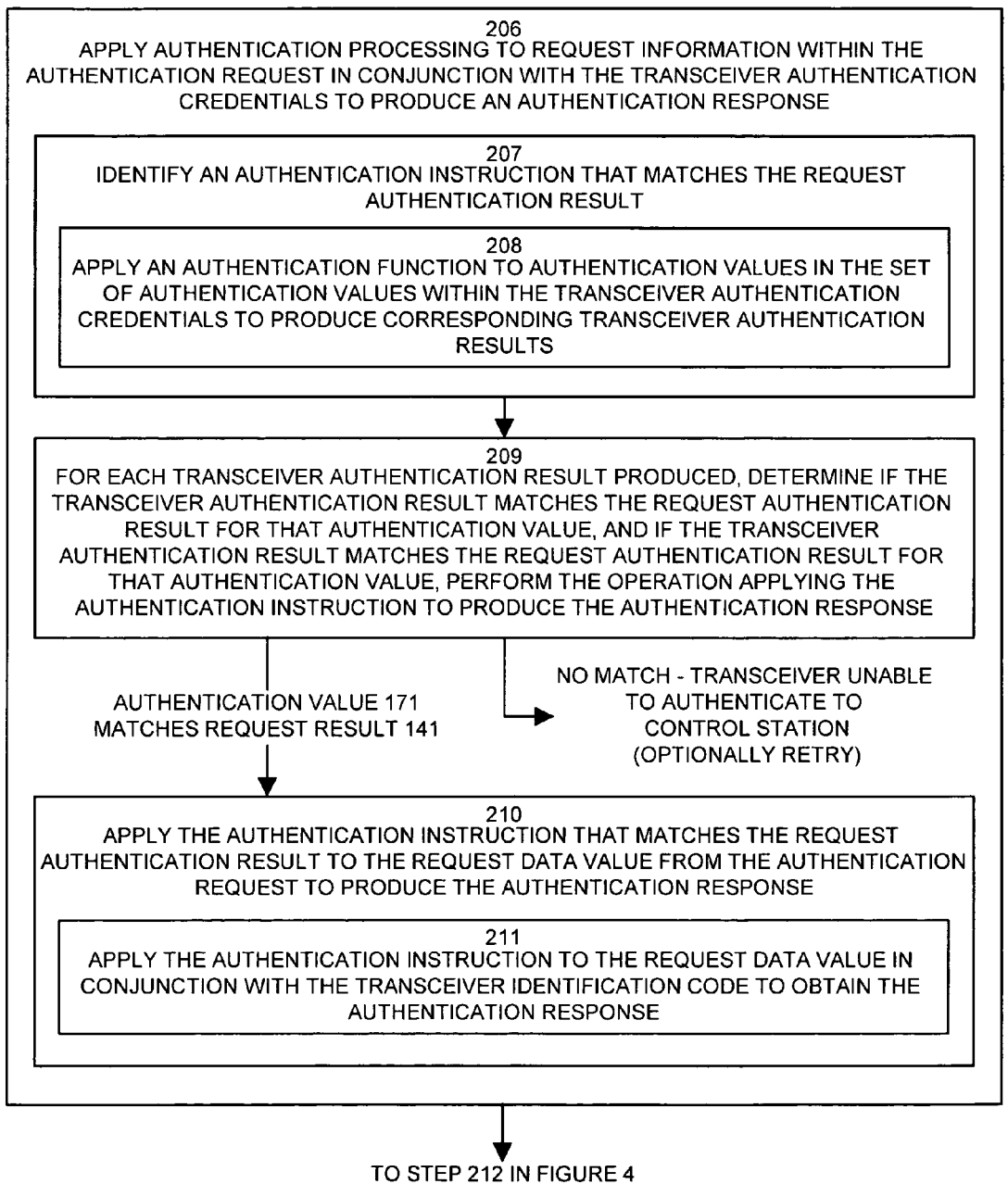
Figure 4:
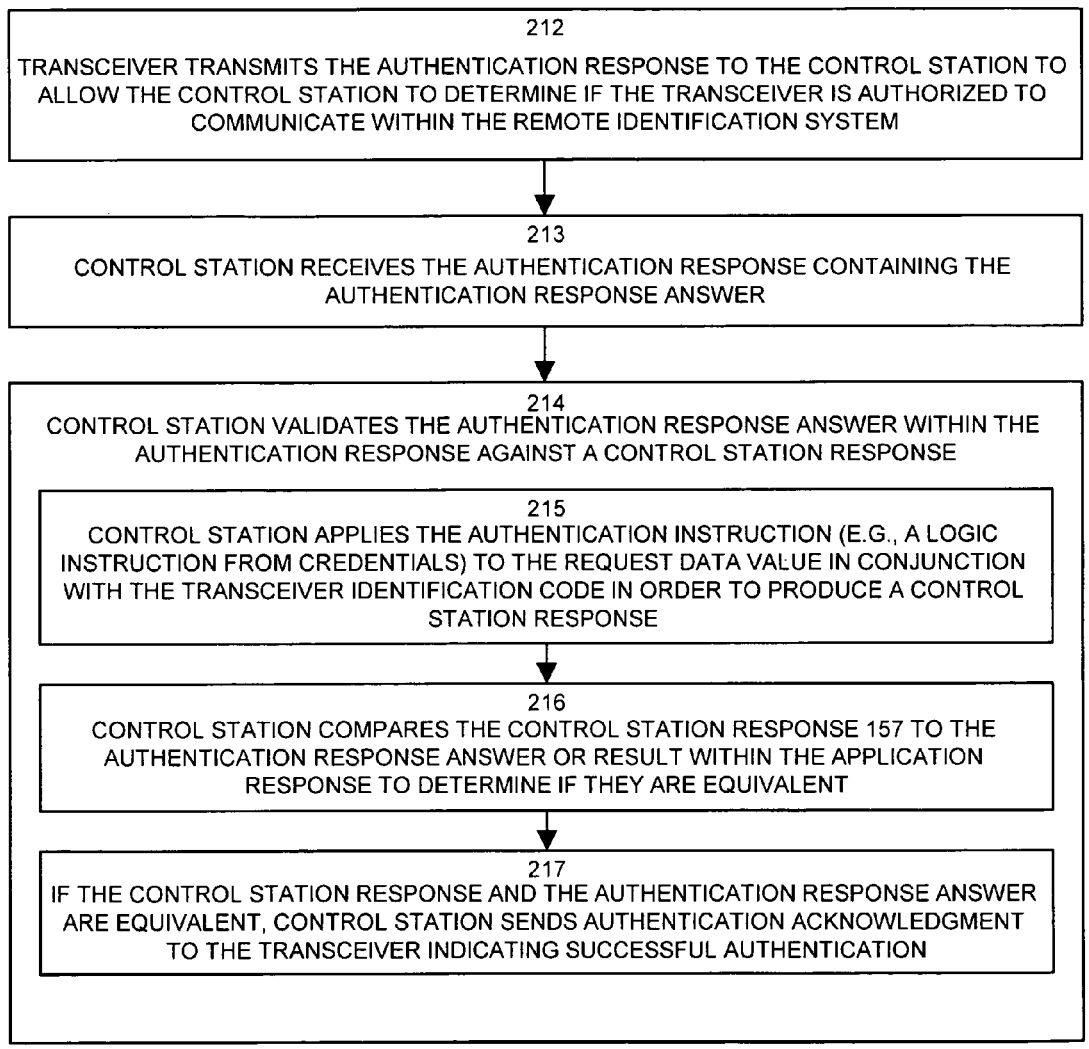

FIGS. 2, 3 and 4 are a single flowchart of processing steps performed by (e.g., between) the control station 110 configured with the transceiver manager 151 and a transceiver 120 configured with the authentication process 160 in accordance with embodiments of the invention. This flow chart of processing steps allows the control station 110 to authenticate the transceiver 120 and allows that transceiver 120 to communicate regarding tagged item information on the transceiver network. Since embodiments of the invention involve significant back and forth (e.g., handshaking) exchanges between the control station 110 and the transceiver 120, some steps in the flow chart indicate processing operations performed by the control station 110 (e.g., by the transceiver manager 151 and/or transceiver authenticator 150), while other steps indicate processing operations performed by the transceiver 120 (e.g., by the authentication process 160). The devices performing the indicated processing for each step will be clearly identified during the discussion of the processing.

In step 200, the control station 110 receives transceiver configuration information for each transceiver 120 including a network address (e.g., a MAC address) and transceiver authentication credentials. This processing step represents an installation and network configuration stage in which the control station 110 is configured (e.g., via the network administrator 101) with a set of allowable MAC addresses for transceivers that will be operating within the remote identification system or network 100. As an example, if there are five transceivers 120, the network manager 101 can configure the control station 110 with the MAC address information of each transceiver as obtained from the manufacturer of that transceiver (or from firmware in the transceiver). The network administrator 101 can also program or load the initial set of authentication credentials 170 into the transceiver 120 as well. As will be explained shortly, the sets of transceiver authentication credentials 170-1 through 170-N can either be manually configured (e.g., by the network manager 101) or may be periodically automatically generated by the transceiver manager 151 and uploaded into the transceiver 120. Thus this configuration process can be fully or partially automated to require little or no assistance form the network manager 101. Details of transceiver configuration in step 200 are shown in sub-steps 201 through 204. As indicated in the flow chart, steps nested within steps (e.g., step boxes within a step box) generally indicate sub-steps or processing operations involved to perform all or a portion of the processing of the outer box, step or operation.

In step 201 a transceiver 120 appears on the network (e.g., is powered on and begins to attempt to communicate with the control station 110).

In step 202, the transceiver 120 requests (via address request 111) and receives (via address response 112) transceiver configuration information including a network address (e.g., an IP address) and a set of transceiver authentication credentials 170 respectively assigned to the transceiver 120. Details of step 202 are shown in sub-steps 203 and 204.

In step sub-203, the transceiver 120 performs address assignment processing to receive the network address 180 for the transceiver 120 to use to communicate on the transceiver network 105. The address assignment processing can include, for example, the transceiver 120 providing its initially configured MAC hardware address in the address request 111 to the transceiver manager 151 for comparison against a set of allowed MAC addresses maintained by the control station 110 in the network addresses information database 190 (within the transceiver database 152). If the transceiver's MAC address is contained in the network address information 190, the transceiver manager 151 operating in the control station 110 can perform DHCP functionality to assign, via the address response 112, an IP address to the requesting transceiver 120. Note that this exchange 111, 112 provides an additional level of security by only assigning IP addresses the transceivers 120 that have known MAC addresses.

Next, in step 204, the transceiver 120 receives transceiver authentication credentials including receiving a transceiver identification code uniquely assigned to the transceiver and a transceiver instruction set containing a set of authentication values and corresponding authentication instructions. This processing can be done automatically by having the transceiver manager 151, in response to a credential request 113 from the transceiver 110, download, via a credential response 114, the appropriate transceiver identification code such as an Electronic Product Code (EPC code or other unique identity) and the transceiver instruction set to the transceiver 120 once its network IP address has been assigned. Automated configuration of the authentication credentials 170 into a transceiver 120 via a request and response sequence 113, 114 allows the system of the invention to cause each transceiver 120 to periodically receive replacement transceiver authentication credentials 170 to replace the transceiver authentication credentials presently configured transceiver 120 further provided in additional level of security in the event that a set of authentication credentials 170 are compromised during operation of the system. Alternatively, the network administrator 101 can program the credentials via input 143 into the transceiver 120 in a secure manner.

A transceiver instruction set within the set of authentication credentials 170 for a transceiver 120 in accordance with one example embodied in the invention is shown in the table below:

TABLE 1

Example Instruction Set for Transceiver 120.

| Authentication Value 171 | Authentication Instruction 173 |
|---|---|
| DJHGKLSHJGFKLR12BJ | AND |
| FVHJKSHGV987K398H0 | OR |
| FHGSUHFSGHILDJHH43 | XOR |
| KFJGHLIGHDVJHSGJDJ | NOR |
| FSJGFDKJHDFDKHDLK | NAND |
| KS7807SVOZHVYJVHD | Right Shift |
| DFOIHSDOGIFGHOIVH | Left Shift |
| DIHFOSHODIHVGHVIH | NAND |
| DIHOFPODMOMJIOJMS | Fwd. Roll Inst. Set |
| ADSFOHKHOMCJC0834 | Bwd. Roll Inst. Set |

In the example instruction set shown above, the authentication values 171 (column 1) may be, for example, a set of strings of alphanumeric characters randomly generated by the transceiver manager 151. For each alphanumeric character string 171 (i.e., each row), the authentication credentials 170 can include a corresponding authentication instruction 173 (Column 3) that may be, for example, a logic instruction such as AND, OR, XOR, NOR, NAND, a shift operation (e.g., right shift or left shift) or an instruction set modification operation such as an instruction to roll the instruction set forward or backward (Fwd. Roll Inst. Set, Bwd. Roll Inst. Set). Column 2 will be used to contain transceiver authentication results 172 that the authentication processor 160 in the transceiver 120 calculates, as will be explained, by application of an authentication function such as a hash function to the authentication values 171 in Column 1 during processing of embodiments of the invention.

Note that the transceiver authentication results 172 in Column 2 are not provided to the transceiver 120 by the control station 110 within the set of authentication credentials 170 but rather, are calculated by the authentication processor 160 in the transceiver by application of a hash function or other authentication function during authentication processing between the control station 110 in the transceiver 120.

Depending upon the embodiment of the invention, Column 1 and 3 (171, 173) of these authentication credentials 170 can be either configured manually (e.g., by the network manager 101 via path 116) or automatically (e.g., via periodic download via credential requests 113 and credential responses 114) into the transceiver 120 prior to installation (i.e., prior to operation) within the network 100. As will be explained, the authentication credentials in Table 1 above allow the system of the invention to determine if the transceiver 120 is a properly authorized transceiver to communicate within the network 100. Once the transceiver 120 is configured with the authentication credentials including the authentication values 171 in column 1 and authentication instruction 173 in Column 3, the transceiver 120 is able to begin authentication processing to validate its authenticity to the control station 110.

In step 205 the transceiver 120 receives an authentication request 140 from the control station 110 within the wireless remote identification system 100. The authentication request 140 includes request information including a request authentication result 141 and a request data value 142. An example of an authentication request 140 transmitted from control station 110 to the transceiver 120 can appear as follows:

(Request Authentication Result 141, Request Data Value 142)

Example Authentication Request 140.

Within the above example authentication request 140, the request authentication result 141 in one configuration is a hash value result produced from a hash function 175 within the control station that the transceiver manager 151 performs on a selected authentication value 171 (e.g., on a selected alphanumeric character string) in Column 1 in set of authentication credentials 170 maintained by the control station 110 on behalf of this transceiver 120. In other words, the authentication request 140 from the control station 110 in one embodiment of the invention provides a hash value 141 that the control station 110 (i.e., the transceiver manager 150) calculates (using a hash authentication function 175) on a selected alphanumeric character string 171 in Column 1 (e.g., that is randomly selected) within the instruction set of the authentication credentials 170 associated with the transceiver 120 being authenticated. The transceiver 120 can use this hash value 141 to determine if it matches a hash value that the transceiver 120 itself calculates (in Column 2 below) on one of the authentication values 171 in Table 1 above, as will be explained in detail next.

In step 206 the transceiver 120 applies authentication processing to the request information (e.g., to the request authentication result 141 and request data value 142) within the authentication request 140 (received form the control station 110) in conjunction with the transceiver authentication credentials 170 to produce an authentication response 142. The processing sub-steps involved to process the authentication request 140 are explained next.

In step 207, the authentication processor 160 operating in the transceiver 120 identifies an authentication instruction 173 (Column 3) that matches the request authentication result 141 received from control station 110 within the authentication request 140.

To do so, in step 208, the authentication process 160 in the transceiver 120 applies an authentication function 175 to authentication values 171 in Column 1 of Table 1 above within the transceiver authentication credentials 170 to produce corresponding transceiver authentication results 172 as shown in Column 2 below:

TABLE 2

Example Instruction Set including calculated Transceiver Authentication Result (Column 2) for a Transceiver 120.

| Authentication Value 171 | Transceiver Authentication Result 172 | Authentication Instruction 173 |
|---|---|---|
| DJHGKLSHJGFKLR12BJ | 456789000000005876 | AND |
| FVHJKSHGV987K398H0 | 456789054675787696 | OR |
| FHGSUHFSGHILDJHH43 | 657890090980898800 | XOR |
| KFJGHLIGHDVJHSGJDJ | 568790080880889567 | NOR |
| FSJGFDKJHDFDKHDLK | 123478900976878777 | NAND |
| KS7807SVOZHVYJVHD | 456789098766789879 | Right Shift |
| DFOIHSDOGIFGHOIVH | 456788798797987070 | Left Shift |
| DIHFOSHODIHVGHVIH | 678902435445264554 | NAND |
| DIHOFPODMOMJIOJMS | 135795457654446454 | Fwd. Roll Inst. Set |
| ADSFOHKHOMCJC0834 | 353634754446566456 | Bwd. Roll Inst. Set |

In one embodiment, the request authentication result 141 (obtained form the control station 110) is a hash value result produced from a hash function 175 within the control station 110 on a selected authentication value 171 from Column 1 (done using the corresponding authentication set 170 maintained by the control station 110) and the authentication function 175 performed by the authentication process 160 in the transceiver 120 provides an equivalent hash function and computes the transceiver authentication result values 172 in Column 2 upon receipt of an incoming authentication request 140.

In step 209, for each transceiver authentication result 172 (Column 2 in Table 1) that is produced in step 208, the authentication process 160 determines if the transceiver authentication result 172 (value in Column 2) matches the request authentication result 141 for that authentication value 171. If the transceiver authentication result 172 computed based on the authentication value 171 matches the request authentication result 141 calculated by the control station 110, the a matching instruction 173 has been identified and processing proceeds to step 210 to perform the operation applying the authentication logic instruction 173 to produce the authentication response 144. Note that if no hash value 172 that the authentication process 160 computes on any authentication result 171 matches the received request authentication result 141, then processing is complete and no authentication response 142 is returned and the transceiver is unable to authenticate itself.

In step 210, the authentication process 160 in the transceiver 120 applies the authentication instruction 173 that matches the request authentication result 141 to the request data value 142 from the authentication request 140 to produce the authentication response 144 containing the calculated authentication response answer 145.

To do so, in step 211, the authentication process 160 in the transceiver 120 applies the authentication instruction 173 (the logic instruction from Column 3) to the request data value 142 in conjunction with the transceiver identification code 181 to obtain the authentication response answer 145 that is then packaged into an authentication response packet 144. As an example, if the authentication instruction 173 is a logical AND instruction, the in step 211, the authentication processor 160 performs a logical AND operation between the request data value 142 (received from the control station 110) and the transceiver identification code 181 (e.g., an EPC code specifically assigned to this transceiver during the configuration stage) to produce a result reflecting the AND'ed value of these two numeric values. This AND'ed result is the authentication response or result 145.

In one embodiment of the invention, the matching authentication instruction 173 is a roll forward, or a roll back, instruction set instruction. This type of instructions causes the authentication instructions 173 in Column 3 to be shifted up or down in position (relative to the fixed position transceiver authentication results 171 in column 1). In such cases, in step 210, the authentication process 160 in the transceiver 120 uses the request data value 142 from the authentication request 140 as a parameter to indicate how many instruction positions are to be to produce the authentication response 144 containing the calculated authentication response answer 145. That is, when the authentication request matches a roll forward or roll back instruction, the transceiver shifts a relationship position of the authentication instructions relative to the transceiver authentication values in the authentication credentials by an amount specified by the request data value, such that each transceiver authentication value in the authentication credentials corresponds to a different authentication instruction than prior to shifting the relationship. In the example authentication credentials in the table above, if the request data value 142 specified a position of two and the instruction was to shift the instruction set up, then each instructions would be moved up two position in the table such that, for example, the NAND instruction would correspond to the XOR transceiver authentication value 171.

In step 212 the transceiver 120 transmits the authentication response 144 (containing the result 145) to the control station 110 to allow the control station 110 to determine (e.g., via application of the same process using its credential information 170 and comparing the result 145 to its own result) if the transceiver 120 is authorized to communicate within the remote identification system 100. Steps 213 through 217 are performed by the control station to check the return authentication response 144 from the transceiver 120 to determine if the transceiver is to be allowed to communicate on the network 100.

In step 213, the control station 110 receives the authentication response 144 containing the authentication response answer 145.

Next, in step 214, the control station 110 validates the authentication response answer 145 within the authentication response 144 against a control station response.

To do so, in step 215, the control station 110 validates the authentication response answer by applying the authentication instruction 173 (the logic instruction from Column 3) to the request data value 142 in conjunction with the transceiver identification code 181 in order to produce a control station response 157.

In step 216, the control station compares the control station response 157 to the authentication response answer or result 145 within the authentication response answer 144 to determine if they are equivalent.

In step 217, if the control station response 157 and the authentication response answer 145 are equivalent, the control station 110 has successfully authenticated the transceiver 120 and the transceiver 120 is allowed to communicate within the network 100. As such, the control station 110 returns an authentication success message 147 to the transceiver 120 indicating the outcome of the authentication processing. If the authentication response answer or result 145 returned from the transceiver 120 to the transceiver authenticator 150 in step 213 matches the result 157 produced in the control station 110, then the authentication success message 147 indicates that the transceiver 120 is allowed to participate in RFID communications on the network 100. If the authentication response answer 145 returned from the transceiver 120 to the transceiver authenticator 150 in step 213 does not match the result 157 produced in the control station 110, then the authentication success message 147 can repeat the processing above for another selected authentication value 171 (e.g., by choosing another string in the credentials 170) or the control station 110 can thereafter ignore further communications from that disallowed transceiver 120.

In this manner, the authentication credentials 170 for processing as explained above allow the control station 110 to authenticate each transceiver 120 within the wireless radio frequency identification network 100. By providing the set of authentication values such as character strings that map to corresponding authentication instructions 173 via an authentication function 175, and by requiring the transceiver 120 to perform a matching hash technique to identify an appropriate instruction to apply to the request data value and 43, embodiments of the invention allow the control station to be assured that only transceivers 120 configured with the appropriate authentication credentials 170 unable to produce an acceptable authentication response answer 145. In this manner, embodiments of the invention enabled the ability to the control station 110 to only accept communications from authenticated and allowed transceivers 120.

Note that the processing explained above can be performed repeatedly for different hash values and data to confirm instruction set validity. Also, by performing this processing periodically, the control station can detect when a transceiver device attempts to assume identity of other already authenticated transceiver.

Those skilled in the art will understand that there can be many variations made to the embodiments explained above while still achieving the same objective of those embodiments and the invention in general. As an example, the order of processing steps could be rearranged while still accomplishing the overall objective of the system of the invention. In addition, different type of authentication functions could be used besides hash functions, such as signature functions, encryption functions, and the like. Such variations are intended to be covered by the scope of this invention. As such, the foregoing description of embodiments of the invention is not intended to be limiting. Rather, any limitations to the invention are presented in the following claims.

What is claimed is:

1. A method for authenticating operation of a transceiver with a control station within a wireless remote identification system, the method comprising:
   receiving transceiver configuration information including a network address and transceiver authentication credentials for associating with the transceiver, wherein receiving the authentication request includes receiving a first data value and a second data value from the control station;
   receiving an authentication request from a control station within the remote identification system;
   producing an authentication response for authenticating the transceiver by applying authentication processing to request information in the authentication request, the authentication processing being based on use of the transceiver authentication credentials associated with the transceiver, wherein producing the authentication response includes:
      utilizing the first data value to identify an instruction of multiple instructions associated with the transceiver;
      computing an authentication response value by applying the identified instruction to the second data value; and
      generating the authentication response to include the authentication response value; and
   transmitting the authentication response to the control station to allow the control station to determine if the transceiver is authorized to communicate within the remote identification system.

2. The method of claim 1 wherein the transceiver is an RFID (Radio Frequency Identification) transceiver and wherein the control station operates an RFID (Radio Frequency Identification) management application to communicate with multiple RFID tags in the wireless remote identification system, the transceiver configured to communicate information received from the multiple RFID tags over a wireless link to the control station.

3. The method of claim 1 wherein receiving transceiver configuration information comprises:
   performing an automatic download operation to receive the transceiver authentication credentials during trusted time period of operation of the transceiver.

4. The method of claim 1, wherein the transceiver authentication credentials includes at least one of a roll forward and a roll back instruction and wherein a request data value in the authentication request from the control station indicates an amount by which to roll an instruction set associated with the transceiver.

5. The method of claim 1 further comprising:
maintaining a set of authentication instructions and corresponding authentication values generated by the transceiver;
matching an authentication value received in the authentication request from the control station to a respective corresponding authentication value in the set;
identifying a corresponding authentication instruction associated with the corresponding authentication value in the set; and
applying the corresponding authentication instruction to a data value in the authentication request to produce the authentication response.

6. The method of claim 1 further comprising:
maintaining a set of authentication instructions and corresponding authentication values generated by the transceiver; and
shifting a relationship position of the authentication instructions relative to the corresponding authentication values in the set by an amount specified by a data value in the authentication request such that, after shifting the relationship position, each corresponding authentication value in the set corresponds to a different authentication instruction than prior to shifting the relationship position of the authentication instruction.

7. A method as in claim 1, wherein applying authentication processing to request information within the authentication request based on the transceiver authentication credentials to produce an authentication response includes:
based on information in the authentication request, identifying one of multiple authentication instructions maintained at the transceiver; and
applying the identified one of multiple authentication instructions to i) a data value in the authentication request received from the control station and ii) an identification code associated with the transceiver to produce the authentication response.

8. The method as in claim 1, wherein transmitting the authentication response to the control station enables the control station to identify whether the transceiver is authorized to communicate with remote tagged items with respect to the transceiver on communication paths other than through the control station, the method further comprising:
receiving an authentication success message from the control station indicating that the transceiver is able to communicate with the remote tagged items.

9. A method as in claim 1, wherein transmitting the authentication response includes:
transmitting the authentication response from the transceiver to the control station, the authentication response including the authentication value to enable the control station to identify whether the transceiver is authorized to communicate with remote tagged items with respect to the transceiver.

10. A method as in claim 1, wherein receiving the authentication request includes receiving a data value associated with the authentication request; and
wherein producing the authentication response includes: i) applying a computational instruction to modify the data value, and ii) generating the authentication response to include the modified data value.

11. A method as in claim 1, wherein receiving the authentication request includes receiving a data value associated with the authentication request; and
wherein producing the authentication response includes:
selecting a given computational instruction of multiple computational instructions associated with the transceiver;
computing an authentication response value by applying the given computational instruction to the data value associated with the authentication request; and
generating the authentication response to include the authentication response value.

12. A method as in claim 1 further comprising:
receiving a set of authentication values and corresponding instructions;
applying a hash function associated with the transceiver to each of the authentication values in the set to create a mapping of hashed authentication values to the corresponding instructions.

13. The method as in claim 1 further comprising:
receiving a message from the control station, the message indicating that the transceiver is able to communicate with multiple wireless RFID tags; and
retrieving information form the wireless RFID tags; and
communicating the information to the control station.

14. The method as in claim 1 further comprising:
maintaining a mapping in which each of multiple values are paired with a corresponding computational instruction for selective application to the second data value received in the request.

15. A method as in claim 1, wherein applying authentication processing to request information in the authentication request based on the transceiver authentication credentials includes:
based on information in the authentication request, identifying one of multiple authentication instructions maintained at the transceiver; and
applying the identified one of multiple authentication instructions to a data value in the authentication request received from the control station to produce the authentication response.

16. The method as in claim 15, wherein transmitting the authentication response to the control station enables the control station to identify whether the transceiver is authorized to communicate with remote tagged items with respect to the transceiver on communication paths other than through the control station, the method further comprising:
receiving an authentication success message from the control station indicating that the transceiver is able to communicate with the remote tagged items.

17. A method as in claim 1, wherein applying authentication processing to the request information includes:
identifying an authentication instruction that matches a request authentication result received in the authentication request; and
applying the authentication instruction that matches the request authentication result to a request data value in the authentication request to produce the authentication response.

18. A method as in claim 17, wherein identifying the authentication instruction includes:
applying an authentication instruction to authentication values in a set of authentication values in the transceiver authentication credentials to produce corresponding transceiver authentication results; and
for each of the corresponding transceiver authentication results, determining if a respective transceiver authentication result matches the request authentication result in the authentication result received in the authentication request; and
when identifying a match between the corresponding transceiver authentication results and the respective transceiver authentication, utilizing the corresponding authentication function to apply to the request data value in the authentication request to produce the authentication response.

19. A method as in claim 1, wherein applying authentication processing to request information within the authentication request based on the transceiver authentication credentials to produce the authentication response includes:
selecting an authentication instruction based on information in the authentication request; and
applying the authentication instruction to a data value in the authentication request received from the control station to produce an authentication value for inclusion in the authentication response.

20. A method as in claim 19, wherein selecting the authentication instruction based on information in the authentication request includes obtaining the authentication instruction from multiple logic operation instructions stored in the transceiver depending on a respective value of the information in the authentication request; and
wherein applying the authentication instructions to the data value includes applying a selected logical operation instructions to the data value in the authentication request to produce the authentication value included in the authentication response.

21. A method as in claim 20, wherein transmitting the authentication response includes:
transmitting the authentication response from the transceiver to the control station, the authentication response including the authentication value to enable the control station to identify whether the transceiver is authorized to communicate with remote tagged items, the transceiver configured to convey information from the remote tagged items to the control station subsequent to authorization by the control station.

22. A method for authenticating operation of a transceiver with a control station within a wireless remote identification system, the method comprising:
receiving transceiver configuration information including a network address and transceiver authentication credentials for associating with the transceiver;
receiving an authentication request from a control station within the remote identification system;
producing an authentication response for authenticating the transceiver by applying authentication processing to request information in the authentication request, the authentication processing being based on use of the transceiver authentication credentials associated with the transceiver; and
transmitting the authentication response to the control station to allow the control station to determine if the transceiver is authorized to communicate within the remote identification system;
wherein receiving transceiver configuration information including a network address and transceiver authentication credentials comprises:
performing address assignment processing to receive the network address;
receiving transceiver authentication credentials including receiving:
i) a transceiver identification code uniquely assigned to the transceiver; and
ii) a transceiver instruction set containing a set of authentication values and corresponding authentication instructions.

23. The method of claim 1 comprising repeating receiving an authentication request, applying authentication processing and transmitting the authentication response until at least one of:
i) an authentication acknowledgement is received from the control station indicating that the transceiver was successfully authenticated; and
ii) a number of repeated attempts to authenticate the transceiver each fail.

24. The method of claim 23 comprising repeating the operations of receiving an authentication request, applying authentication processing and transmitting the authentication response and upon each repeated iteration of such operations, the authentication request specifies at least one of:
i) a different request authentication result for use by the transceiver to select an authentication instruction; and
ii) a different request data value for use by the transceiver during application of the selected authentication instruction.

25. The method of claim 22 wherein receiving transceiver configuration information comprises:
periodically receiving replacement transceiver authentication credentials to replace the transceiver authentication credentials formerly received by the transceiver.

26. The method of claim 25 wherein the request information within the authentication request includes:
i) an request authentication result; and
ii) a request data value;
wherein applying authentication processing to request information within the authentication request based on the transceiver authentication credentials to produce the authentication response comprises:
identifying an authentication instruction that matches the request authentication result; and
applying the authentication instruction that matches the request authentication result to the request data value from the authentication request to produce the authentication response.

27. The method of claim 26 wherein the identified authentication instruction is at least one of a roll forward and a roll back instruction and wherein the request data value indicates an amount by which to roll the instruction set and wherein applying the authentication instruction that matches the request authentication result to the request data value from the authentication request to produce the authentication response comprises:
shifting a relationship position of the authentication instruction relative to the transceiver authentication values in the authentication credentials by an amount specified by the request data value, such that each transceiver authentication value in the authentication credentials corresponds to a different authentication instruction than prior to shifting the relationship position of the authentication instruction.

28. The method of claim 26 wherein identifying an authentication instruction that matches the request authentication result comprises:
applying an authentication function to authentication values in the set of authentication values within the transceiver authentication credentials to produce corresponding transceiver authentication results; and
for each transceiver authentication result produced, determining if the transceiver authentication result matches the request authentication result for that authentication value, and if the transceiver authentication result matches the request authentication result for that authentication value, performing the operation applying the authentication instruction to produce the authentication response.

29. The method of claim 28 wherein the request authentication result is a hash value result produced from a hash function within the control station and wherein the authentication function is an equivalent hash function within the transceiver and wherein the request authentication result is calculated by the control station using the hash function on a copy of the authentication values in the set of authentication values within the transceiver authentication credentials that is programmed into the control station.

30. The method of claim 28 wherein applying the authentication instruction that matches the request authentication result to the request data value from the authentication request to produce the authentication response comprises:
applying the authentication instruction to the request data value based on the transceiver identification code to obtain the authentication response.

31. In a control station for management of transceivers, a method for authenticating operation of a transceiver with the control station, the method comprising:
providing transceiver configuration information including a network address and transceiver authentication credentials to a transceiver;
providing an authentication request from the control station within the remote identification system to the transceiver, the authentication request containing a request authentication result and a request data value;
receiving an authentication response from the transceiver, the authentication response containing an authentication response answer to the authentication request, the authentication response answer including a computed data value derived by the transceiver applying a computational instruction to the request data value; and
determining if the authentication response answer is valid by applying authentication processing to the authentication response answer within the authentication response in conjunction with the transceiver authentication credentials, and if the authentication response answer is valid, transmitting an authentication success message to the transceiver.

32. The method of claim 31 wherein providing an authentication request from the control station within the remote identification system to the transceiver, the authentication request containing a request authentication result and a request data value comprises:
selecting a transceiver authentication value from the transceiver authentication credentials; and
applying an authentication function to the transceiver authentication value to produce the request authentication result for use in the authentication request.

33. The method of claim 32 wherein determining if the authentication response answer is valid comprises:
applying an authentication instruction corresponding to the selected transceiver authentication value to the request data value in conjunction with a transceiver identification code of the transceiver to which the authentication request was provided in order to produce a control station response; and
comparing the control station response to the authentication response answer within the authentication response to determine if they are equivalent, and if they are equivalent, indicating that the authentication response answer is valid.

34. A transceiver comprising:
a memory;
a processor;
a communications interface;
an interconnection mechanism coupling the memory, the processor, and the communications interface, the memory encoded with an authentication process that when executed by the processor, causes the transceiver authenticate operation of the transceiver with a control station within a wireless remote identification system by causing the transceiver to perform the operations of:
receiving, via the communications interface, transceiver configuration information including a network address and transceiver authentication credentials,
receiving, via the communications interface, an authentication request from a control station within the remote identification system;
applying authentication processing to request information within the authentication request by modifying the request information using the transceiver authentication credentials;
producing an authentication response to include the modified request information; and
transmitting, via the communications interface, the authentication response to the control station to allow the control station to determine if the transceiver is authorized to communicate within the remote identification system;
wherein when the transceiver performs the operation of receiving transceiver configuration information including a network address and transceiver authentication credentials, the transceiver performs the operations of:
performing address assignment processing to receive the network address;
receiving transceiver authentication credentials including receiving:
i) a transceiver identification code uniquely assigned to the transceiver; and
ii) a transceiver instruction set containing a set of authentication values and corresponding authentication instructions.

35. The transceiver of claim 34 wherein the transceiver is an RFID (Radio Frequency Identification) transceiver and wherein the control station operates an RFID (Radio Frequency Identification) management application.

36. The transceiver of claim 34 wherein when the transceiver performs the operation of receiving transceiver configuration information, the transceiver performs the operation of:
performing an automatic download operation to receive the transceiver authentication credentials during trusted time period of operation of the transceiver.

37. The transceiver of claim 34 wherein the transceiver performs the operation of repeating receiving an authentication request, applying authentication processing and transmitting the authentication response until at least one of:
i) an authentication acknowledgement is received from the control station indicating that the transceiver was successfully authenticated; and
ii) a number of repeated attempts to authenticate the transceiver each fail.

38. The transceiver of claim 37 wherein the transceiver performs the operation of repeating the operations of receiving an authentication request, applying authentication processing and transmitting the authentication response and upon each repeated iteration of such operations, the authentication request specifies at least one of:

i) a different request authentication result for use by the transceiver to select an authentication instruction; and ii) a different request data value for use by the transceiver during application of the selected authentication instruction.

39. The transceiver of claim 34 wherein when the transceiver performs the operation of receiving transceiver configuration information, the transceiver performs the operation of:

periodically receiving replacement transceiver authentication credentials to replace the transceiver authentication credentials formerly received by the transceiver.

40. The transceiver of claim 39 wherein the request information within the authentication request includes:

i) an request authentication result; and ii) a request data value;

wherein when the transceiver performs the operation of applying authentication processing to request information within the authentication request in conjunction with the transceiver authentication credentials to produce an authentication response, the transceiver performs the operations of:

identifying an authentication instruction that matches the request authentication result; and applying the authentication instruction that matches the request authentication result to the request data value from the authentication request to produce the authentication response.

41. The transceiver of claim 40 wherein the identified authentication instruction is at least one of a roll forward and a roll back instruction and wherein the request data value indicates an amount by which to roll the instruction set and wherein when the transceiver performs the operation of applying the authentication instruction that matches the request authentication result to the request data value from the authentication request to produce the authentication response, the transceiver performs the operation of:

shifting a relationship position of the authentication instruction relative to the transceiver authentication values in the authentication credentials by an amount specified by the request data value, such that each transceiver authentication value in the authentication credentials corresponds to a different authentication instruction than prior to shifting the relationship position of the authentication instruction.

42. The transceiver of claim 40 wherein when the transceiver performs the operation of identifying an authentication instruction that matches the request authentication result, the transceiver performs the operations of:

applying an authentication function to authentication values in the set of authentication values within the transceiver authentication credentials to produce corresponding transceiver authentication results; and for each transceiver authentication result produced, determining if the transceiver authentication result matches the request authentication result for that authentication value, and if the transceiver authentication result matches the request authentication result for that authentication value, performing the operation applying the authentication instruction to produce the authentication response.

43. The transceiver of claim 42 wherein the request authentication result is a hash value result produced from a hash function within the control station and wherein the authentication function is an equivalent hash function within the transceiver and wherein the request authentication result is calculated by the control station using the hash function on a copy of the authentication values in the set of authentication values within the transceiver authentication credentials that is programmed into the control station.

44. The transceiver of claim 42 wherein when the transceiver performs the operation of applying the authentication instruction that matches the request authentication result to the request data value from the authentication request to produce the authentication response, the transceiver performs the operation of:

applying the authentication instruction to the request data value in conjunction with the transceiver identification code to obtain the authentication response.

45. A control station comprising:

a memory;

a processor;

a communications interface;

an interconnection mechanism coupling the memory, the processor, and the communications interface, the memory encoded with an authentication process that when executed by the processor, causes the control station to authenticate operation of a transceiver with the control station within a wireless remote identification system by causing the control station to perform the operations of:

providing, via the communications interface, transceiver configuration information including a network address and transceiver authentication credentials to a transceiver;

providing, via the communications interface, an authentication request from the control station within the remote identification system to the transceiver, the authentication request containing a request authentication result and a request data value;

receiving, via the communications interface, an authentication response from the transceiver, the authentication response containing an authentication response answer to the authentication request; and determining if the authentication response answer is valid by applying authentication processing to the authentication response answer within the authentication response in conjunction with the transceiver authentication credentials, and if the authentication response answer is valid, transmitting, via the communications interface, an authentication success message to the transceiver.

46. The control station of claim 45 wherein when the control station performs the operation of providing an authentication request from the control station within the remote identification system to the transceiver, the authentication request containing a request authentication result and a request data value, the control station performs the operations of:

selecting a transceiver authentication value from the transceiver authentication credentials; and applying an authentication function to the transceiver authentication value to produce the request authentication result for use in the authentication request.

47. The control station of claim 46 wherein when the control station performs the operation of determining if the authentication response answer is valid, the control station performs the operations of:

applying an authentication instruction corresponding to the selected transceiver authentication value to the request data value in conjunction with a transceiver identification code of the transceiver to which the authentication request was provided in order to produce a control station response; and comparing the control station response to the authentication response answer within the authentication response to determine if they are equivalent, and if they are equivalent, indicating that the authentication response answer is valid.

48. A method for authenticating operation of a transceiver with a control station within a wireless remote identification system, the method comprising:
   receiving transceiver configuration information including a network address and transceiver authentication credentials for associating with the transceiver, wherein receiving the authentication request includes receiving a first data value and a second data value from the control station;
   receiving an authentication request from a control station within the remote identification system;
   producing an authentication response for authenticating the transceiver by applying authentication processing to request information in the authentication request, the authentication processing being based on use of the transceiver authentication credentials associated with the transceiver, wherein producing the authentication response includes:
      utilizing the first data value to identify an instruction of multiple instructions associated with the transceiver;
      computing an authentication response value by applying the identified instruction to the second data value; and
      generating the authentication response to include the authentication response value; and
   transmitting the authentication response to the control station to allow the control station to determine if the transceiver is authorized to communicate within the remote identification system;
   wherein receiving the transceiver authentication credentials includes:
   receiving a first alphanumeric value and a corresponding first instruction;
   receiving a second alphanumeric value and a corresponding second instruction; and
   maintaining the first alphanumeric value and the corresponding first instruction at the transceiver as a first value-instruction pair;
   maintaining the second alphanumeric value and the corresponding second instruction at the transceiver as a second value-instruction pair.

49. A method as in claim 48 further comprising:
   applying the authentication processing at the transceiver to the first alphanumeric value to generate a first transceiver generated result associated with the first alphanumeric value and the corresponding first instruction;
   applying the authentication processing at the transceiver to the second alphanumeric value to generate a second transceiver generated result associated with the second alphanumeric value and the corresponding second instruction;
   maintaining the first transceiver generated result along with the first value-instruction pair; and
   maintaining the second transceiver generated result along with the second value-instruction pair.

50. A method as in claim 49, wherein applying authentication processing to request information within the authentication request includes:
   identifying an authentication value in the authentication request received from the control station;
   matching the authentication value in the authentication request to one of the first transceiver generated result and the second transceiver generated result; and
   if the authentication value in the authentication request received from the control station matches the first transceiver generated result, utilizing the corresponding first instruction to generate a response to the control station; and
   if the authentication value in the authentication request received from the control station matches the second transceiver generated result, utilizing the corresponding second instruction to generate a response to the control station.

51. A method as in claim 49, wherein applying authentication processing to request information within the authentication request includes:
   identifying an authentication value in the authentication request received from the control station;
   attempting to match the authentication value in the authentication request to one of the first transceiver generated result and the second transceiver generated result; and
   if the authentication value in the authentication request received from the control station does not match either of the first and second transceiver generated result, failing authentication of the transceiver.

* * * * *